Aug. 27, 1968     H. O. EKENGARD     3,398,972

STABILIZING DEVICE FOR ROLLING VEHICLES

Filed Aug. 8, 1966

INVENTOR.
Hans Olov Ekengard
BY
Cushman, Darby & Cushman
Attorneys

United States Patent Office 3,398,972
Patented Aug. 27, 1968

3,398,972
STABILIZING DEVICE FOR ROLLING VEHICLES
Hans Olov Ekengard, Gardsstigen 10, Alvsjo, Sweden
Filed Aug. 8, 1966, Ser. No. 571,121
3 Claims. (Cl. 280—150.5)

ABSTRACT OF THE DISCLOSURE

A device for maintaining a vehicle such as a tow truck stationary while a winch mounted thereon effects a tractional force longitudinally of the vehicle. The device or support means includes an arm positioned at each side of the vehicle chassis, one end of the arm being journalled on the chassis and capable of swinging movement about a horizontal axis to engage the ground behind the rear wheels in order to lift them from the ground. The support means includes at least two curved plate members which when in the retracted position overlap a fixed cooperating mudguard to form an unbroken surface which prevents the ingress of dirt and other foreign matter.

---

Figure 1:
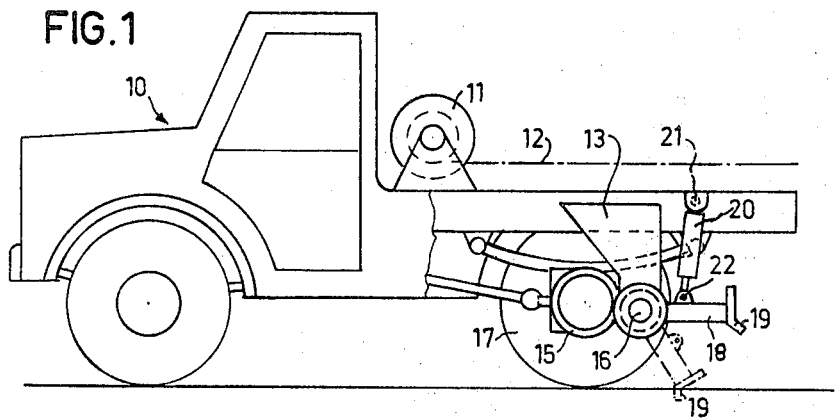

This invention relates to means in a vehicle from which a tractive force is to be effected in a substantially longitudinal plane of said vehicle, for instance, a break down lorry, to take up the reaction from said tractive force.

When salvaging broken down cars or car wrecks the car or wreck is sometimes found in such a position that a very great tractive force must be employed to shift same. Break down lorries are therefore usually provided with a winch or other hauling gear which can be used to exert a tractive force on the car wreck which force is directed in a plane longitudinally of the lorry. The reaction from said force must then be taken up by the wheels and breaks of the lorry which often has the result that only a part of the winch effect can be used. If the hauling power thus being usable is too small to shift the wreck special measures must be employed. It is thus sometimes necessary to exert said tractive force transversal of the lorry or to use tackle.

The available tractive force also varies from instance to instance in dependence of the grip of the lorry wheels in the ground. Thus the weather conditions and the conditions of the tires have a great effect. Since the most car accidents happen when the road conditions are slippery and skiddy this disadvantage is of great importance.

It has previously been proposed to provide vehicles with swingable supports which can abut the ground behind the rear wheels to neutralize the reactive force resulting from the tractive force. These arrangements however, are disadvantageous in that the swingable supports and the controlling means therefor must be arranged behind the rear wheels. Accordingly, their positioning prevents mounting of mudguards for the rear wheels. Thus the supports, and in particular the controlling means for the supports, will become extremely dirty with the passage of time. This condition is accentuated by the fact that tow trucks of this nature are frequently used under bad road conditions. The presence of a large amount of foreign matter on and within the supports and controlling means can render these elements inoperative.

Furthermore, the unprotected arrangement of the supports and controlling means results in a large number of projecting parts or elements at the rear end of the vehicle chassis. These projecting parts can get caught or tangled in bushes and stumps, or become stuck in the ground so as to impede movement of the vehicle, and the suports and controlling means may be damaged in the process. When it is recalled that tow trucks of this nature are often used in rough terrain, it is apparent that the above constitutes a potentially significant disadvantage.

An object of the invention is to provide means in a vehicle of the type stated by aid of which the longitudinal reaction of said tractive force is counteracted and the vehicle is maintained stationary also when the whole which effect is brought to bear upon a wreck.

Another object of the invention is to provide such means in a relatively inexpensive manner and in such a way that when not used they do not interfere with the operation of said lorry.

Another important object of the invention is that the aforementioned support means for maintaining the vehicle stationary also functions as at least part of the mudguards for the rear wheels in order to protect the apparatus from the ingress of mud, dirt or the like.

Figure 2:
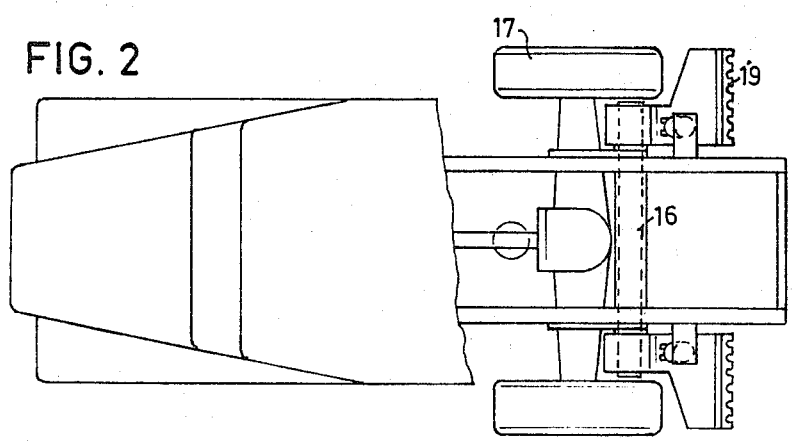
Figure 3:
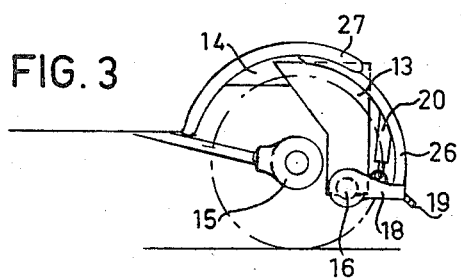

Some embodiments of the invention will be more particularly described with reference to the accompanying schematical drawing, in which FIG. 1 is an elevation of a lorry incorporating the invention partly in section, FIG. 2 is a plane view of the lorry in FIG. 1, and FIG. 3 is a view showing the rear part of a lorry incorporating a second embodiment of the invention.

Referring now to the drawings and especially to FIG. 1, 10 denotes a break down lorry on which a winch 11 or corresponding hauling gear is provided. The wire 12 of said winch 11 can be rolled out longitudinally of said lorry 10 and the end thereof can be fastened to a car wreck or other object to be salvaged. When said winch is active to pull in said car wreck the wire 12 is subjected to tension and a reactive force acts on the lorry striving to move same towards the wreck in the direction of said wire 12. In earlier known vehicles of the kind stated said reaction force was counteracted through the breaking force of the vehicle with the inherent disadvantages stated in the introduction.

By the vehicle shown in FIG. 1 brackets 13 carried by each of the frame side members 14 of the chassis of the vehicle depends behind the rear axle housing 15 of the vehicle. At the lower ends said brackets 13 carry a stationary transversal shaft 16 to the ends of which extend outside of said brackets 13 almost up to the rear wheels 17. One end of a swingable arm 18 is journalled on each shaft end and the other free end of said swinging arm 18 is provided with teeth 19 which penetrate into the ground surface when the arm is swung down with said free end into engagement with the ground.

One end of a hydraulic jack 20, preferably the end of the cylinder thereof, is swingably journalled to a stub axle 21 which is fixed relative to the chassis of the vehicle. The other end of said jack 20, viz. the free end of the piston rod of same, is swingably journalled on a stub shaft 23 positioned on the swingable arm 18 intermediate the ends thereof. One hydraulic jack 20 is provided for each swingable arm 18. When oil or another pressure fluid is introduced into the jack cylinders the extension of said jacks 20 causes the arms 18 to swing downwardly or clockwise as seen in FIG. 1 round the shaft 16 until the teeth 19 at the free end of said arms 18 dig into the ground a short distance behind the rear wheels and lift said wheels off the ground. The arms 18 are held in this position by the jacks 20 and when the winch 11 is used the reaction from same upon the lorry 10 is taken up by said arms 18 so that the lorry 10 remains stationary even when the traction force of said winch 11 is very great.

When the jacks 20 are retracted the arms 18 swing upwardly or counter-clockwise as seen in FIG. 1 and lower the rear wheel 17 into contact with the ground and thereafter continue their swinging movement until they are completely out of the way as shown in full lines in FIG. 1.

In the embodiment shown in FIG. 1 a plate 24 is welded to the free end of each swingable arm 18 substantially in a plane tangential to the path said end follows when swinging. Said teeth 19 protrude on the outside of said plate 24. In the retracted position said plates form continuations of the rear ends of the mudguards for the rear wheels 17. Such a construction increases the length of the arch of the pivotal movement of said arms 18 in the direction upwards as the mudguards do not interfere with said movement until said arms 18 are properly retracted. In this position said plates 24 form extensions of the mudguards so that the effectivity thereof is not lessened.

FIG. 3 shows a second embodiment which especially is suited to smaller lorries. Said embodiment also comprises brackets 13 which depend from the frame side members 14 of the vehicle to the rear of the rear axle housing 15. Said brackets 13 also carry a fixed transversal shaft 16 and an arm 18 is swingably journalled at each of the protruding ends of said shaft 16. In the retracted position said arms 18 extend mainly horizontally and they can be swung downwards by aid of hydraulic jacks 20 one for each arm. The ends of said jacks 20 are pivoted stationary stub axles of the chassis and on a stub shaft of each arm 18, respectively.

At the free end each arm 18 is welded to a plate 26 having a curvature corresponding to the cooperating mudguard 27. Said mudguard 27 is relatively short, having its rear edge only a short distance behind the axis of the rear wheel. The curved plate 26 of each arm 18 forms the rear part of the mudguard 27 when said arm 18 is in horizontal position. When the arms 18 are swung down the bottom edge of the plate 26 abuts the ground and teeth 19 formed in said edge dig into the ground whereupon further swinging movement lifts the hind wheels from the ground so that the lorry remains stationary when the winch wire is tensioned. In the retracted position the top edges of said plates 26 overlap the rear edges of the mudguards 27 so that an unbroken surface is formed and the length of the mudguard in transport position is the usual. It is apparent therefore, that this mudguard arrangement will be quite significant in the prevention of equipment failure due to an excessive amount of road dirt and other foreign matter accumulating in the apparatus.

The constructions shown in both the embodiments have the advantage that the whole device for lifting the rear wheels and keeping the lorry stationary is positioned inside the rear wheels and within the space defined by the mudguards so that said device will never obstruct other operations of the lorry. The operating of the arms with individual jacks makes it possible to level the rear end of the lorry when working on uneven ground.

Preferably a stop member is provided for each arm 18 to limit the downward swinging movement of same to a position in which the line of contact of the teeth 19 with the ground lies well behind the axis of the rear wheels whereby the lifting and lowering of the lorry is facilitated.

The above described embodiments must not be considered to have any limiting effect as several alterations can be made within the scope of the invention. Thus for instance, arms displaceable in longitudinal direction along suitable guidings inclining downwards and backwards can be used instead of the swingable arms.

What I claim is:
1. In a vehicle from which a tractive force is to be effected in a longitudinal plane of said vehicle:
   support means positioned at the side frame members of the chassis of said vehicle, said support means capable of swinging movement around a fixed horizontal axis transverse of said vehicle from a retracted position at a substantial distance from the ground to a position in engagement with the ground a short distance behind the rear wheels of said vehicle, in order to lift said wheels off of the ground and to counteract said tractive force,
   said support means including at least two curved plate members, each of said curved plate members being movable with respect to said fixed horizontal axis, such that,
   when the curved plate members are in the retracted position, each of said curved plate members form a continuous, unbroken surface with a cooperating fixed mudguard, positioned on said vehicle above each of the rear wheels thereof, thus providing a mudguard extension which prevents the ingress of dirt and other foreign matter into the support means of said vehicle.

2. The vehicle of claim 1 in which said curved plate members and said cooperating mudguards partially overlap one another when said support means is in the retracted position.

3. The vehicle of claim 2 in which said support means includes stop means provided to limit the swinging movement of said support means into engagement with the ground, such that the line of engagement between said support means and the ground is positioned behind the axle of the rear wheels of the vehicle.

References Cited

UNITED STATES PATENTS

| 1,358,347 | 11/1920 | Brink | 280—151 |
| 1,795,208 | 3/1931 | Garner | 296—1 |
| 2,137,703 | 11/1938 | Seyferth | 280—33.1 |
| 2,655,340 | 10/1953 | Dalton | 254—86 |
| 3,104,891 | 9/1963 | Dalton | 280—150.5 |
| 3,175,698 | 3/1965 | Dassler | 212—145 |
| 3,261,478 | 7/1966 | Sonerud | 212—145 |
| 3,310,181 | 3/1967 | Symmank | 212—145 |

OTHER REFERENCES

Commercial Car Journal, October 1953, p. 109.

BENJAMIN HERSH, *Primary Examiner.*

J. SIEGEL, *Assistant Examiner.*